US011252699B2

(12) United States Patent
Liu et al.

(10) Patent No.: US 11,252,699 B2
(45) Date of Patent: Feb. 15, 2022

(54) METHOD AND DEVICE FOR RESOURCE ALLOCATION

(71) Applicant: NEC CORPORATION, Tokyo (JP)

(72) Inventors: Hongmei Liu, Beijing (CN); Lei Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/724,823

(22) Filed: Dec. 23, 2019

(65) Prior Publication Data

US 2020/0128514 A1 Apr. 23, 2020

Related U.S. Application Data

(63) Continuation of application No. 15/758,939, filed as application No. PCT/CN2016/073226 on Feb. 2, 2016, now Pat. No. 10,517,073.

(51) Int. Cl.
*H04W 72/04* (2009.01)

(52) U.S. Cl.
CPC .................................. *H04W 72/04* (2013.01)

(58) Field of Classification Search
None
See application file for complete search history.

(56) References Cited

U.S. PATENT DOCUMENTS

| 8,054,767 | B2 * | 11/2011 | Choi | H04W 72/1284 370/280 |
|---|---|---|---|---|
| 10,075,955 | B2 | 9/2018 | Mizusawa | |
| 2008/0316950 | A1 * | 12/2008 | Damnjanovic | H04W 52/146 370/311 |
| 2009/0232075 | A1 * | 9/2009 | Konta | H04L 5/0096 370/329 |
| 2009/0323625 | A1 * | 12/2009 | Lee | H04W 72/042 370/329 |
| 2010/0027446 | A1 * | 2/2010 | Choi | H04L 5/0053 370/280 |
| 2010/0067479 | A1 | 3/2010 | Choi et al. | |
| 2010/0135222 | A1 * | 6/2010 | Arnott | H04W 72/042 370/329 |

(Continued)

FOREIGN PATENT DOCUMENTS

| CN | 101394656 A | 3/2009 |
|---|---|---|
| CN | 102118865 A | 7/2011 |

(Continued)

OTHER PUBLICATIONS

Communication dated Jun. 23, 2020, from the European Patent Office in application No. 16888670.3.

(Continued)

*Primary Examiner* — Brian S Roberts
(74) *Attorney, Agent, or Firm* — Sughrue Mion, PLLC

(57) ABSTRACT

Embodiments of the disclosure provide a method and device for allocating resource in a wireless communication system. The method comprises: determining a set of user equipment (UEs) requesting for resource allocation based on resource available in the wireless communication system and a resource use requirement; allocating the resource to the set of UEs according to the resource use requirement; and sending information about the allocated resource to each UE in the set of UEs.

15 Claims, 5 Drawing Sheets

(56) References Cited

U.S. PATENT DOCUMENTS

| | | | | |
|---|---|---|---|---|
| 2010/0290405 A1* | 11/2010 | Arnott | ............... | H04W 72/0446 370/329 |
| 2011/0065468 A1* | 3/2011 | Parkvall | ............. | H04W 72/042 455/509 |
| 2011/0176502 A1* | 7/2011 | Chung | ................. | H04L 5/0048 370/329 |
| 2011/0305211 A1 | 12/2011 | Lunttila et al. | | |
| 2012/0307771 A1 | 12/2012 | Yang et al. | | |
| 2013/0128852 A1 | 5/2013 | Xue et al. | | |
| 2013/0176952 A1* | 7/2013 | Shin | ................... | H04W 72/042 370/329 |
| 2013/0294247 A1 | 11/2013 | Zhu et al. | | |
| 2014/0044085 A1 | 2/2014 | Hong | | |
| 2014/0086205 A1* | 3/2014 | Nakasato | .............. | H04L 5/0037 370/330 |
| 2016/0338124 A1* | 11/2016 | Byun | ................... | H04L 5/0094 |

FOREIGN PATENT DOCUMENTS

| | | |
|---|---|---|
| CN | 102726109 A | 10/2012 |
| JP | 2010506500 A | 2/2010 |
| JP | 2013511940 A | 4/2013 |
| WO | 2008109269 A2 | 9/2008 |
| WO | 2015/142555 A1 | 9/2015 |

OTHER PUBLICATIONS

Communication dated Nov. 29, 2019 from the Intellectual Property India in Indian Application No. 201817009941.
Communication dated Dec. 10, 2019, from the Japanese Patent Office in application No. 2018-519896.
Communication dated Jan. 6, 2020, from the Canadian Intellectual Property Office in Application No. 3,004,698.
Qualcomm Incorporated, "Candidate Solutions for LAA-LTE", 3GPP TSG RAN WG1 #79, R1-145084, Nov. 17-21, 2014, San Francisco, USA, pp. 1-7 (7 pages total).
Communication dated Apr. 2, 2019, from Japanese patent Office in counterpart application No. 2018-519896.
Communication dated Feb. 14, 2019, from European Patent Office in counterpart application No. 16888670.3.
Communication dated Jan. 14, 2019, from Canadian Intellectual Property Office in counterpart application No. 3004698.
Communication dated Nov. 1, 2018, from the Russian Federal Service for Intellectual Property in counterpart Application No. 2018108242/08.
International Search Report of PCT/CN2016/073226 dated Oct. 27, 2016.
Written Opinion of the International Searching Authority of PCT/CN2016/073226 dated Oct. 27, 2016.
Communication dated Jan. 5, 2021, from the Canadian Intellectual Property Office in Application No. 3,004,698.
Communication dated Dec. 9, 2020 in Japanese Application No. 2018-519896.
LG Electronics, "Discussion on resource allocation for D2D mode 2 communication", 3GPP TSG RAN WG1 Meeting #78, Dresden, Germany, Aug. 18-22, 2014, R1-143179, pp. 1-10.
Communication dated Jun. 23, 2021, issued by the State Intellectual Property Office of the P.R.C. in application No. 201680054913.9.

* cited by examiner

METHOD AND DEVICE FOR RESOURCE ALLOCATION

CROSS REFERENCE TO RELATED APPLICATIONS

This application is a Continuation of U.S. patent application Ser. No. 15/758,939 filed Mar. 9, 2018, which is a National Stage Entry of International Application No. PCT/CN2016/073226 filed Feb. 2, 2016, the disclosure of which is incorporated herein in its entirety by reference.

FIELD OF THE INVENTION

Embodiments of the present invention generally relate to communication techniques. More particularly, embodiments of the present invention relate to a method and device for resource allocation in a wireless communication system.

BACKGROUND OF THE INVENTION

For a wireless communication system, allocation of resource such as spectrum and time is very important. The spectrum may comprise licensed carrier(s) and unlicensed carrier(s). A licensed carrier represents a frequency band that is exclusively licensed to a specific operator to provide specific wireless services. On the other hand, an unlicensed carrier represents a frequency band that is not allocated to a specific operator, but is opened so that all entities meeting the predefined requirements may use the frequency band. Uplink data transmission on the unlicensed carrier is able to offload the traffic on the licensed carrier.

Recently, some wireless communication systems require that the transmission bandwidth of a device on the unlicensed carrier should satisfy a resource use requirement, for example, being not less than 80% of the total system bandwidth. If the resource allocated to the device cannot satisfy the resource, the device is not allowed to work properly in the wireless communication systems. However, conventional resource allocation solutions do not take the resource use requirement into account.

Therefore, there is a need for a scheme for allocating resource in a wireless communication system according to the resource use requirement.

SUMMARY OF THE INVENTION

The present invention proposes a solution for allocating resource in a wireless communication system according to a resource use requirement.

According to a first aspect of embodiments of the present invention, embodiments of the invention provide a method of allocating resource in a wireless communication system. The method comprises: determining a set of user equipment (UEs) requesting for resource allocation based on resource available in the wireless communication system and a resource use requirement; allocating the resource to the set of UEs according to the resource use requirement; and sending information about the allocated resource to each UE in the set of UEs.

According to a second aspect of embodiments of the present invention, embodiments of the invention provide a device for allocating resource in a wireless communication system. The device comprises: a determining unit configured to determine a set of UEs requesting for resource allocation based on resource available in the wireless communication system and a resource use requirement; an allocating unit configured to allocate the resource to the set of UEs according to the resource use requirement; and a sending unit configured to send information about the allocated resource to each UE in the set of UEs.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

As used herein, the term "user equipment" or "UE" refers to any device that is capable of communicating with the BS. By way of example, the UE may include a terminal, a Mobile Terminal (MT), a Subscriber Station (SS), a Portable Subscriber Station, a Mobile Station (MS), or an Access Terminal (AT).

Embodiments of the present invention may be applied in various communication systems, including but not limited to a Long Term Evolution (LTE) system or a Long Term Evolution Advanced (LTE-A) system. Given the rapid development in communications, there will of course also be future type wireless communication technologies and systems with which the present invention may be embodied. It should not be seen as limiting the scope of the invention to only the aforementioned system.

Figure 1:
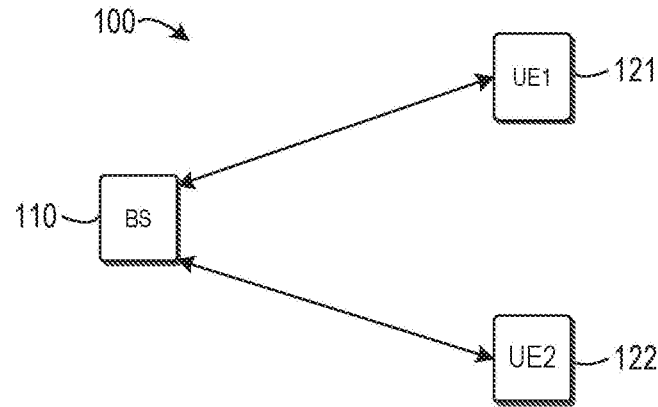
FIG. 1 illustrates a schematic diagram of a wireless communication system 100 according to embodiments of the invention.

Now some exemplary embodiments of the present invention will be described below with reference to the figures. Reference is first made to FIG. 1, which illustrates schematic diagram of a wireless communication system 100 according to embodiments of the invention.

In the wireless communication system 100, there illustrate a BS 110 that communicates with two UEs 121 and 122 (also referred to as UE1 and UE2 hereafter). Conventionally, the UEs may transmit a resource allocation request requesting for resource allocation before transmission of control information or data to or from the BS 110. Upon receipt of the resource allocation request, the BS 110 allocates time and/or frequency resources to the UEs, respectively, according to resource available in the wireless communication system 100.

In the example of FIG. 1, the BS 110 receives two resource allocation requests from UE1 and UE2, respectively, and allocates the resource available in the wireless communication system 100 to the UEs according to a resource use requirement. The resource use requirement is a requirement on the minimum resource occupied by a UE in transmission in the wireless communication system 100 and may be defined by operators, service providers, and/or the like. By way of example, the resource use requirement may require 80% bandwidth occupancy. It is to be noted that the above example is described for example rather than limitation. Those skilled in the art will readily understand that the 80% bandwidth occupancy is just an example of the resource use requirement, and other bandwidth occupancies, such as 60%, 70% and 90%, are also applicable.

Furthermore, although two UEs 121 and 122 are illustrated in FIG. 1, they are described only for the purpose of illustrating the principles of the present invention, rather than limiting the scope thereof. There may be more or less UEs in the wireless communication system 100 within the scope of the subject matter.

As discussed above, conventional resource allocation solutions do not take the resource use requirement into account. To solve this problem, embodiments of the present invention propose a solution as discussed below, such that resource allocated to a UE satisfies the resource use requirement.

Figure 2:
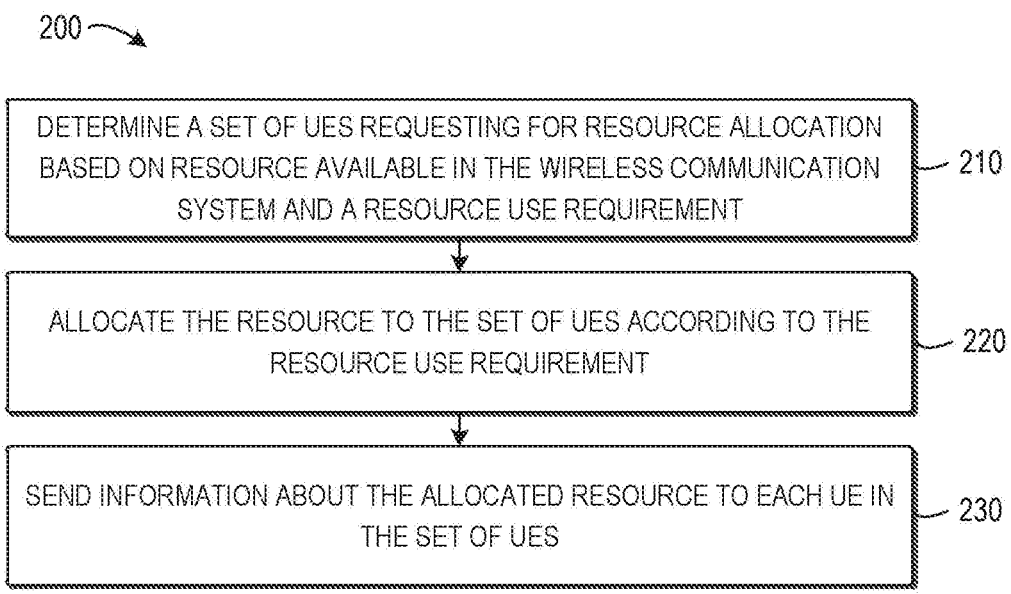
FIG. 2 illustrates a flow chart of a method 200 for allocating resource in a wireless communication system according to embodiments of the invention.

Now some exemplary embodiments of the present invention will be described below with reference to the following figures. FIG. 2 illustrates a flow chart of a method 200 for allocating resource in a wireless communication system according to embodiments of the invention. The wireless communication system may be implemented as the wireless communication system 100, and the method 200 may be implemented at the BS 110 or other suitable device.

The method 200 is entered in step 210, where a set of UEs requesting for resource allocation are determined based on resource available in the wireless communication system and a resource use requirement. The set of UEs may comprise one or more UEs that request the BS to allocate resource so as to perform transmission.

According to embodiments of the present invention, the set of UEs for resource allocation may be determined in several ways. In some embodiments, a maximum number of UEs for the set may be determined based on the resource available in the wireless communication system and the resource use requirement. Then the set of UEs may be determined from those sending a resource allocation request according to the maximum number. For example, if there are three UEs sending the resource allocation request, the BS may select two (for example, UE1 and UE2) from the three UEs according to priorities of the UEs, the amount of resource requested by the UEs, and/or other related factors. The priorities may be for example predefined in advance or determined by the BS according to certain rules. In this event, the set of UEs include UE1 and UE2.

In addition to, or alternatively, in some embodiments, the maximum number of UEs may be determined based on a periodicity for dividing the resource available in the wireless communication system into multiple groups of resource blocks. The periodicity indicates a number of resource blocks in each group used for allocating to the set of UEs, and may be determined based on the resource use requirement.

Next, in step 220, the resource is allocated to the set of UEs according to the resource use requirement, and in step 230, information about the allocated resource is sent to each UE in the set of UEs.

According to embodiments of the present invention, there may be a variety of ways to allocate the resource to the set of UEs according to the resource use requirement. In some embodiments, at least a part of the resource available in the wireless communication system may be divided into groups of resource blocks. The number of the resource blocks in each group is equal to the periodicity. Next, in each group of resource blocks, a subgroup of resource blocks may be determined for each UE in the set of UEs. Then, the subgroup of resource blocks may be allocated to the each UE. In this case, when sending information about the allocated resource, the BS may send information about the periodicity and the subgroup of resource blocks to each one in the set of UEs.

In addition to or alternatively, in some embodiments, the resource available in the wireless communication system may include a first part and a second part that is different from the first part, and the at least a part of the resource as discussed above may be considered as the first part. In this case, in step 220, the BS may allocate the second part of resource to one or more UEs in the set of UEs. In an embodiment, in step 230, the BS may send, to the each one in the set of UEs, information about the periodicity, the subgroup of resource blocks, as well as allocated resource blocks in the second part of the resource. Alternatively, the information about the allocated resource blocks in the second part of the resource may not need to be sent to the UEs. In this case, both the BS and the UEs may agree to a predetermined resource allocation scheme in advance. Upon receipt of the information about the periodicity and the subgroup of resource blocks, each of the UEs may know the index of the allocated resource block(s) in the second part of the resource. For instance, the index of the allocated resource block(s) in the second part may be determined according to the received information about the periodicity and the subgroup of resource blocks.

As an alternative, in some embodiments, in step 220, the BS may divide the resource into a first edge part, a second edge part and a center part without overlap based on the resource use requirement. Next, a pair of resource blocks may be allocated for each UE in the set of UEs. The pair of resource blocks may include a first resource block belonging to the first edge part and a second resource block belonging to the second edge part, and a frequency span between the first resource block and the second resource block satisfies the resource use requirement. Then, a collection of remaining resource blocks may be allocated from the center part to each one in the set of UEs according to the resource allocation request therefrom. In this case, in step 230, the BS may send information about the pair of resource blocks and the collection of remaining resource blocks to the each UE.

As a further alternative, in some embodiments, in step 220, the BS may allocate a first resource block and a second resource block to each UE of the set of UEs. The frequency span between the first resource block and the second resource block satisfies the resource use requirement. As such, the set of UEs can multiplex in both the first resource block and the second resource block. Then, the BS may allocate a collection of remaining resource blocks to the each UE according to a resource allocation request from the UE, wherein the remaining resource blocks excluding the first and second resource blocks. In this case, in step 230, the BS may send information about the collection of remaining resource blocks to the each UE.

Figure 3:
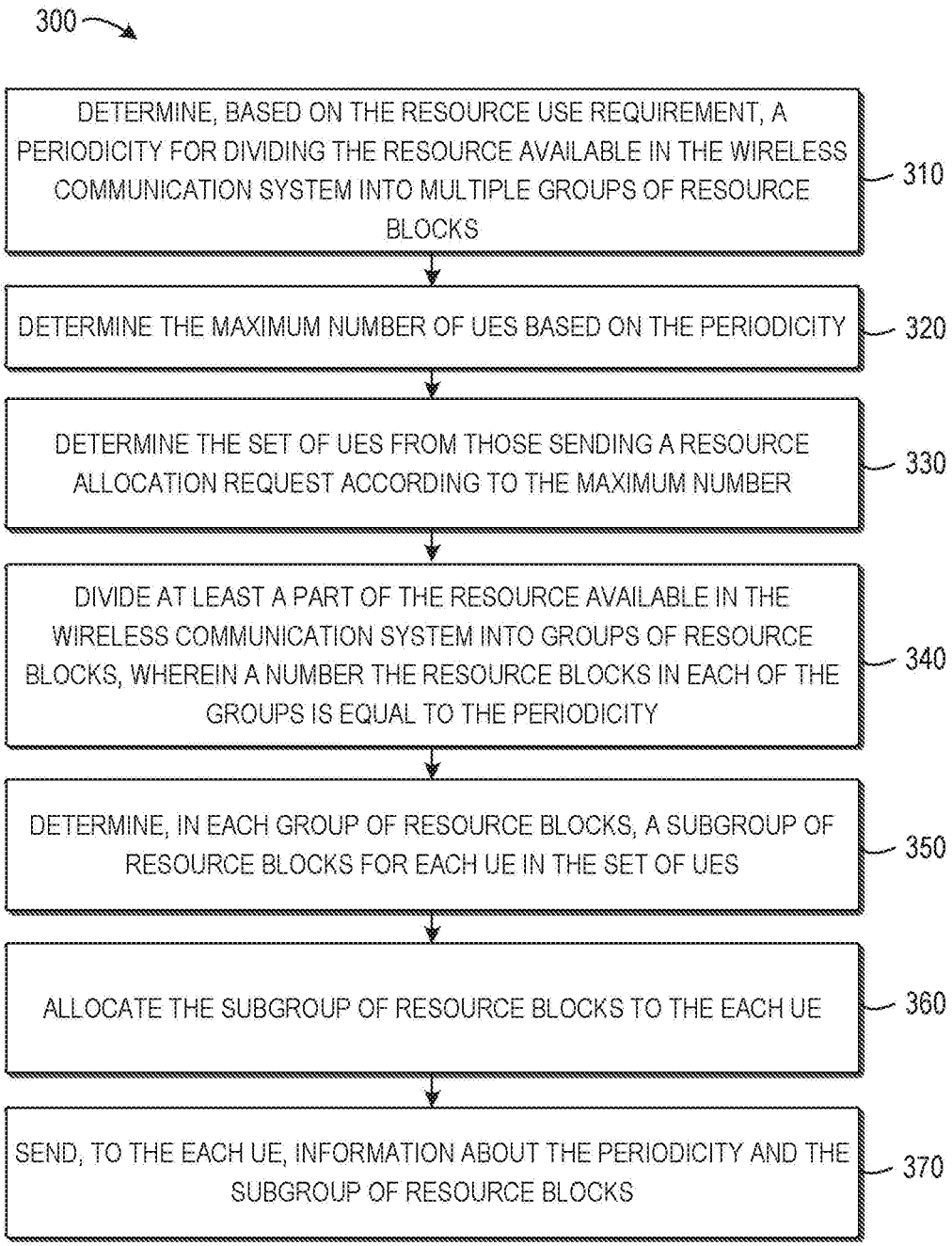
FIG. 3 illustrates a flow chart of a method 300 for allocating resource in a wireless communication system according to an embodiment of the invention.

More details of embodiments of the present invention will be discussed with reference to FIGS. 3 and 5. FIG. 3 illustrates a flow chart of a method 300 for allocating resource in a wireless communication system according to an embodiment of the invention. The method 300 may be considered as a specific implementation of the method 200 described above with reference to FIG. 2. However, it is noted that this is only for the purpose of illustrating the principles of the present invention, rather than limiting the scope thereof.

The method 300 is entered in step 310, where a periodicity for dividing the resource available in the wireless communication system into multiple groups of resource blocks is determined based on the resource use requirement.

According to embodiments of the present invention, the periodicity may be determined in several ways. In some embodiments, it is supposed that the number of resource blocks allocated to a UE in the set of UEs is an integral multiple of the number of resource blocks allocated to another UE in the set, and the total number B of resource blocks included in the resource available in the wireless communication system can be an integral multiple of the periodicity P or divided exactly by the periodicity P, that is B mod P=0. In such embodiments, the periodicity may be determined based on the resource available in the wireless communication system and the resource use requirement as follows:

$$\frac{P-1}{B} \leq (1-R) \tag{1}$$

where P represents the periodicity, B represents the total number of resource blocks included in the resource available in the wireless communication system, and R represents the resource use requirement. In an example, assuming that the system bandwidth is 5 MHz which comprises 25 RBs and the resource use requirement requires 80% bandwidth occupancy, the periodicity P may be determined as 5. In this event, the BS may use 1 bit to indicate the periodicity in sending the information about the allocated resource to each UE in the set of UEs.

Alternatively, in some embodiments, according to the equation (1), multiple candidates may be determined for the periodicity. In this case, the periodicity may be selected from the candidates randomly or according to some requirements or conditions of the wireless communication system, the BS and/or the UEs. For instance, assuming that the bandwidth of the wireless communication system is 10 MHz which comprises 50 RBs and the resource use requirement requires 80% bandwidth occupancy, the candidates for the periodicity may be determined as 10, 5 and 2, and the periodicity may be selected from the candidates as 10, for example. In this event, the BS may use 2 bits to indicate the periodicity in sending the information about the allocated resource to each UE in the set of UEs.

As an further alternative, in some embodiments, if B mod P=0, the periodicity P may be determined according to:

$$\frac{2 \times P - 1}{B} < (1-R) \tag{2}$$

It is to be understood that the above embodiments are described for illustration rather than limitation. Those skilled in the art will readily understand that there are other ways to determine the periodicity. In some embodiments, it is supposed that the total number of resource blocks included in the resource available in the wireless communication system cannot be divided exactly by the periodicity or is not an integral multiple of the periodicity, that is B mod P≠0, then the periodicity may be determined according to:

$$\frac{(P-1)+(B \bmod P)}{B} \leq (1-R) \tag{3}$$

In an example, it is supposed that the bandwidth of the wireless communication system is 5 MHz, that is B=25 RBs, and the resource use requirement R requires 80% bandwidth occupancy, that is, R=80%. According to the equation (3), the candidates for the periodicity may be determined as 1, 2, 3, 4, and 5, and the periodicity may be selected from the candidates as 3, for example. In this case, three bits may be used to indicate the periodicity.

In step 320, the maximum number of UEs is determined based on the periodicity. In some embodiments, the maximum number of UEs may be directly determined as the periodicity determined in step 310. Those skilled in the art would appreciate that although some embodiments of the present invention discussed below use the periodicity as the maximum number of UEs, the maximum number of UEs is not necessarily equal to the periodicity. In some embodiments, the maximum number may be set as a natural number less than the periodicity.

In step 330, the set of UEs are determined from those sending a resource allocation request according to the maximum number. In some embodiments, if the periodicity is determined as 2 in step 310 and the maximum number of UEs is determined as the periodicity in step 320, then the BS may determine that 2 UEs are to be allocated the resource and the 2 UEs constitute the set of UEs (also referred to as a "UE set" hereafter). The BS may select 2 UEs from multiple UEs requesting for resource allocation randomly or according to certain rules, for example, according to a chronological order of the requests sent from the UEs, the amount of resource requested by the UEs, priorities of the UEs, and/or the like. Those skilled in the art can define and implement the rules for selecting the UEs to constitute the UE set in a variety of ways, which are not detailed here.

In step 340, at least a part of the resource available in the wireless communication system is divided into groups of resource blocks. According to embodiments of the present invention, the number of the resource blocks in each of the groups is equal to the periodicity.

As discussed above, the total number of resource blocks included in the resource available in the wireless communication system may be or may not be an integral multiple of the periodicity, that is, B mod P=0 or B mod P≠0. In some embodiments where B mod P=0, all of the resource blocks available in the wireless communication system may be exactly divided into multiple groups of resource blocks. For example, assuming that there are 12 RBs in total and the periodicity is 3, the 12 RBs may be divided into 4 groups, wherein each group includes 3 RBs.

In some other embodiments where B mod P≠0, a part of the resource blocks B may be selected such that the selected part can be exactly divided by the periodicity. For example, assuming that there are 14 RBs in total and the periodicity is 3, 12 RBs may be selected from the total 14 RBs and may be divided into 4 groups, wherein each group includes 3 RBs.

Figures 4A, 4B, 4C, 4D, 4E:
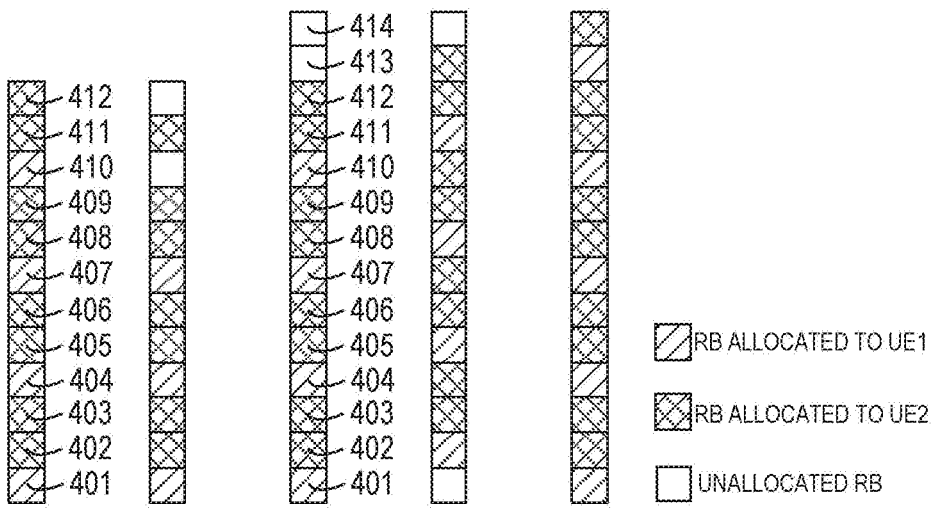
FIGS. 4A-4E illustrate a schematic diagram of allocation of resource blocks (RBs) according to embodiments of the invention, respectively.

In step 350, in each group of resource blocks, a subgroup of resource blocks is determined for each UE in the set of UEs. In step 360, the subgroup of resource blocks are allocated to the each UE. For each UE in the UE set, the subgroup may comprise one or more RBs in the respective groups of RBs. In some embodiments, it is supposed that the UE set includes 2 UEs, UE1 and UE2. Then, in step 350, three RBs in each group may be allocated to the UE1 and UE2 in a predetermined manner. For example, in a group, a first RB may be allocated to the UE1, and the second and third RBs may be allocated to the UE2. FIG. 4A illustrates a schematic diagram of allocation of RBs according to embodiments of the invention. In the example of FIG. 4A, it is supposed that the BS decides to allocate 4 RBs to UE1 and allocate 8 RBs to UE2 The periodicity may be determined according to equation (1) as discussed above, for example 3. In the example of FIG. 4A, the available resource includes 12 RBs 401-412, and the 12 RBs are divided into 4 groups, each group comprising 3 RBs. In the first group (RBs 401-403), RB 401 is allocated to UE1 and RBs 402 and 403 are allocated to UE2. RBs 404-412 in the other three groups are allocated to UE1 and UE2 in an analogue manner. In this way, a subgroup of RBs 401, 404, 407 and 410 are determined for allocating to UE1, and another subgroup of RBs 402-403, 405-406, 408-409 and 411-412 are determined for allocating to UE2.

Embodiments described with FIG. 4A relate to the case that the RBs allocated to UE1 is an integral multiple, of the RBs allocated to UE2. It is to be noted that these embodiment are described for illustration rather than limitation. The present invention also applies for the case that the RBs allocated to UE1 is not an integral multiple of the RBs allocated to UE2. FIG. 4B illustrates a schematic diagram of allocation of RBs according to such embodiments of the invention.

In the example of FIG. 4B, it is supposed that the BS decides to allocate 3 RBs to UE1 and allocate 7 RBs to UE2, The periodicity may be determined according to equation (2) as discussed above, for example 3. In the example of FIG. 4B, the available resource is also represented by 12 RBs 401-412, and the 12 RBs are divided into 4 groups, each group comprising 3 RBs. Referring the subgroups of RBs to be allocated to UE1 and UE2 as the first subgroup and the second subgroup, respectively, the numbers (in this example, 3 and 7) of the RBs in the first and second subgroups may be adjusted to two updated numbers (for example, 4 and 8), wherein the updated number for UE2 is an integral multiple of the new number for UE1. In particular, the number of the RBs in the i subgroup, denoted as Ri, may be calculated according to:

$$Ri = Mi \times \left(\frac{B}{P}\right) - Di \quad (4)$$

where Mi is an integer, and $0 \leq Mi \leq P$; Di is the difference between Ri and the upper bounded RBs for UEi, and may be calculated by:

$$Di = \lceil Ri/(B/P) \rceil * (B/P) - \lfloor Ri/(B/P) \rfloor * (B/P) - Ri \bmod (B/P) \quad (5)$$

where $\lceil Ri/(B/P) \rceil$ represents rounding up the result of Ri/(B/P) to an integer, and $\lfloor Ri/(B/P) \rfloor$ represents rounding down the result of Ri/(B/P) to an integer. In the example of FIG. 4B, R1=3, R2=7, B=12, and P=3, it thus can be determined according to equation (5) that D1=1 and D2=1. In this event, it may be determined that the updated number of RBs in the first subgroup is R1+D1=4, and the updated number of RBs in the second subgroup is R2+D2=8. Then, the BS may allocate the 12 RBs to UE1 and UE2 in a similar way as the embodiments of FIG. 4A, except that the BS needs to remove 1 RB from the subgroup of RBs allocated to UE1 and the subgroup of RBs allocated to UE2, respectively. As shown in the example of FIG. 4B, RB 410 is removed from the first subgroup and will not be allocated to UE1, and RB 412 is removed from the second subgroup and will not be allocated to UE2. In this way, a subgroup of RBs 401, 404 and 407 are determined for allocating to UE1, and another subgroup of RBs 402-403, 405-406, 408-409 and 411 are determined for allocating to UE2.

According to embodiments of the present invention, the total resource blocks may be divided as a first part and a second part that is different from the first part. Either of the first and second parts may comprise one or more RBs. In some embodiments, the number of RBs comprised in the first part may be an integral multiple of the periodicity, and the second part may comprise the remaining RBs of the total resource blocks. The RBs in the first part may be allocated to the UEs in the UE set according to embodiments as discussed above, and the RBs in the second part may be not allocated to any UEs in the UE set, or may be allocated to one or more UEs in the UE set randomly or according to some predefined rules. FIGS. 4C-4E illustrate a schematic diagram of allocation of RBs according to such embodiments of the invention, respectively. The periodicity used in embodiments of FIGS. 4C-4E may be determined according to equation (3) as discussed above.

In the example of FIG. 4C, the available resource includes 14 RBs 401-414, wherein the first part of resource includes 12 RBs 401-412 and the second part of resource includes 2

RBs 413-414. The 12 RBs 401-412 are divided into 4 groups in a similar way as embodiments of FIG. 4A. The RBs 413 and 414 are neither allocated to UE1 nor UE2. In this way, a subgroup of RBs 401, 404, 407 and 410 are determined for UE1, and another subgroup of RBs 402-403, 405-406, 408-409 and 411-412 are determined for UE2.

The RBs in the second part may be discontinuous. In the example of FIG. 4D, the available resource includes 14 RBs, also referred to as RBs 401-414, wherein the first part of resource includes 12 RBs 402-411 and the second part of resource includes 2 RBs 401 and 414. The RBs 402-411 are divided into 4 groups, each group including 3 RBs. The RBs 401 and 414 are neither allocated to UE1 nor UE2. In this way, a subgroup of RBs 402, 405, 408 and 411 are determined for UE1, and another subgroup of RBs 403-404, 406-407, 409-410 and 412-413 are determined for UE2.

It is to be understood that, alternatively, or in addition to the embodiments shown in FIG. 4C, the unallocated two RBs 413 and 414 may be further allocated to UEs in the UE set. In the example of FIG. 4E, RB 413 is further allocated to UE1 and RB 414 is further allocated to UE2. In this way, a subgroup of RBs 401, 404, 407, 410 and 413 are determined for UE1, and another subgroup of RBs 402-403, 405-406, 408-409, 411-412 and 414 are determined for UE2.

In step 370, information about the periodicity and the subgroup of resource blocks are sent to the each UE. The information may have various forms and may be transmitted via a legacy signaling or a new signaling.

In embodiments of the present invention, in a group of RBs, for example RBs 401-403 shown in FIG. 4A, different bitmaps may be employed to indicate the RBs allocated to the different UEs. For example, the bitmap for UE1 may be "100", wherein "1" indicates that the first RB in a group is allocated to UE1 and the subsequent two "0" indicate that the remaining two RBs in the group are not allocated to UE1. Likewise, the bitmap for UE2 may be "011", which means that the first RB in a group is not allocated to UE2 and the second and third RBs in the group are allocated to UE2. Thus, in step 370, the BS may send the bitmap for UE 1 and the periodicity to UE1 and send the periodicity and send the bitmap for UE2 to UE2. Some examples are shown in the following table 1:

TABLE 1

| System bandwidth | RB number, B | Periodicity without resource use requirement | 80% channel occupancy satisfied periodicity, P | Bit for indicating P | bitmap size | Total payload size |
|---|---|---|---|---|---|---|
| 5 MHz | 25 | 5 | 5 | 1 | 5 | 6 |
| 10 MHz | 50 | 25, 10, 5, 2 | 10, 5, 2 | 2 | 10 | 12 |
| 20 MHz | 100 | 50, 25, 20, 10, 5, 4, 2 | 20, 10, 5, 4, 2 | 3 | 20 | 23 |

In Table, 1, the "system bandwidth" represents the resource available in the wireless communication system. The "RB number", B, represents resource blocks in the system bandwidth. The "periodicity without resource use requirement" represents possible periodicities without considering the resource use requirement. The "80% channel occupancy satisfied periodicity", P, represents the periodicity or candidates of the periodicity that satisfy the resource use requirement of 80% channel occupancy. As discussed above, P or its candidates may be calculated based on equation (1). The "bit for indicating P" represents the number of bits for indicating the periodicity. The "bitmap size" represents the number of bits in a bitmap for indicating the subgroup of RBs to each UE. The "total payload size" represents the total number of bits for indicating the information sent to each UE. In this example, the "total payload size" is the sum of the "bit for indicating P" and the "bitmap size".

Referring to embodiments illustrated with respect to FIG. 4B, in step 370, the information sent to the UEi (i=1 or 2) may further include Di, in addition to the periodicity and the subgroup of resource blocks. Some examples are shown in the following table 2:

TABLE 2

| System bandwidth | RB number, B | System periodicity P | 20% B | 80% channel occupancy satisfied periodicity, P | Max Di | Bit for indicating P | Bit for indicating Di | bitmap size | Total payload size |
|---|---|---|---|---|---|---|---|---|---|
| 5 MHz | 25 | 5 | 5 | NA | NA | NA | NA | NA | NA |
| 10 MHz | 50 | 25, 10, 5, 2 | 10 | 2, 5 | 5 | 1 | 3 | 5 | 9 |
| 20 MHz | 100 | 50, 25, 20, 10, 5, 4, 2 | 20 | 2, 4, 5, 10 | 10 | 2 | 4 | 10 | 16 | the resource available in the wireless communication system. "Max Di" represents the maximum number of Di and may be calculated according to equation (5). Di may be a number larger than 0 and no more than the Max Di. "Bit for indicating Di" represents the number of bits for indicating the Di. The "total payload size" represents the total number of bits for indicating the information sent to each UE. In this example, the "total payload size" is the sum of the "bit for indicating P", "bit for indicating Di" and the "bitmap size".

Regarding the embodiments described with reference to FIGS. 4C-4D, in step 370, the information sent to the UEs may contain different items from the embodiments of FIG. 4A or 4B. As discussed above, in embodiments of FIG. 4C, the remaining RBs 411-412 are kept blank, and the starting resource allocation position is the lowest RB 401. Some examples are shown in the following Table 3.

TABLE 3

| System bandwidth | RB number | 80% channel occupancy satisfied periodicity, P | P number | Bit for indicating P | bitmap size | Total payload size |
|---|---|---|---|---|---|---|
| 5 MHz | 25 | 1, 2, 3, 4, 5 | 5 | 3 | 5 | 8 |
| 10 MHz | 50 | 1, 2, 3, 4, 5, 6, 7, 8, 10 | 9 | 4 | 10 | 14 |
| 20 MHz | 100 | 1, 2, 3, 4, 5, 6, 7, 8, 9, 10, 11, 12, 14, 16, 20 | | 4 | 20 | 24 |

In table 3, "P number" indicates the number of periodicity satisfying the resource use requirement. In such embodiments, in step 370, the BS sends information about the periodicity and the subgroup of resource blocks (for example, the bitmap or other suitable indications of the subgroup of resource blocks) are sent to the each UE.

In embodiments of FIG. 4D, the remaining RBs 401 AND 412 are kept blank, and the starting resource allocation position is RB 402, which can be configured by RRC signaling. In these embodiments, in step 370, the information sent to UEs may comprise an offset RB number, in addition to the periodicity and the subgroup of resource blocks. The offset RB number indicates the offset of the starting RB allocated to the UEs from the whole RBs. In the example of FIG. 4D, since the starting RB allocated to the UEs is RB 402, and the offset of the RB 402 from the starting RB 401 of whole RBs is 1, the offset RB number may be set as 1.

In embodiments of FIG. 4E, the remaining RBs 411-412 are allocated to UE1 and UE2, respectively, and the starting resource allocation position is still the lowest RB 401. In these embodiments, in step 370, the information sent to UEs may comprise an indication of the allocated remaining RB(s), in addition to the periodicity and the subgroup of resource blocks.

Figure 5:
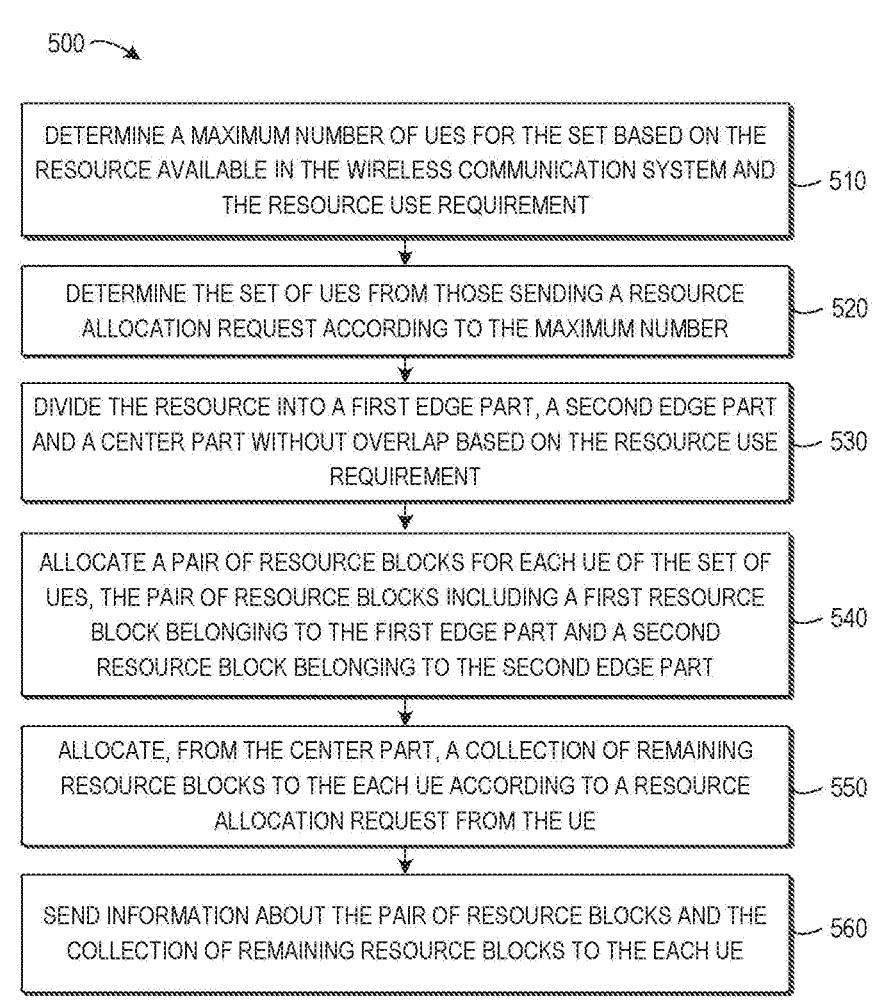
FIG. 5 illustrates a flow chart of a method 500 for allocating resource in a wireless communication system according to a further embodiment of the invention.

Now reference is made to FIG. 5, which illustrates a flow chart of a method 500 for allocating resource in a wireless communication system according to embodiments of the invention. The method 500 may be considered as a further specific implementation of the method 200 described above with reference to FIG. 2. Different from the method 300 discussed above, the method 500 does not allocate the resource according to the periodicity. However, it is noted that this is only for the purpose of illustrating the principles of the present invention, rather than limiting the scope thereof.

The method 500 is entered in step 510, where a maximum number of UEs is determined for the set based on the resource available in the wireless communication system and the resource use requirement. According to embodiments of the present invention, the maximum number may be determined in several ways. For example, assuming that the resource use requirement is 80% bandwidth occupancy and the available resource includes 12 RBs, 20% RBs may be determined from the 12 RBs and rounded down to an integer. In this case, 20% of 12 RBs are 2.4 RBs and the result of rounding down 2.4 is 2. Thus, the maximum number of UEs may be determined as 2 or less than 2.

In step 520, the set of UEs is determined from those sending a resource allocation request according to the maximum number. This step is similar to step 330, and thus is not detailed here.

In step 530, the resource is divided into a first edge part, a second edge part and a center part without overlap based on the resource use requirement. The first edge part may include one or more RBs near the stating position of the available resource, the second edge part may include one or more RBs near the ending position of the available resource, and the center part may include RBs between the first edge part and the second edge part. In the embodiments, the number of RBs in the first edge part may be determined based on the resource use requirement. If the resource use requirement is R bandwidth occupancy and the total number of RBs of the available resource is N, then the number of RBs in the first edge part may be calculated by rounding down B*(1−R) to an integer. Thus, in the case that R=80% and B=12 RBs, the first edge part may be determined as comprising 2 RBs. The RB number in the second edge part may be determined in a similar way. The RB number in the center part may be calculated by subtracting the RBs in the first edge and the second edge from the total number of RBs. In the above example, the RB number in the center part is (B−2*⌊20% B⌋).

In step 540, a pair of resource blocks is allocated for each UE of the set of UEs. The pair of resource blocks includes a first resource block belonging to the first edge part and a second resource block belonging to the second edge part. The frequency span between the first resource block and the second resource block satisfies the resource use requirement. The index of the first resource block in the first edge part may be the same as the index of the second resource block in the second edge part.

Figure 6:
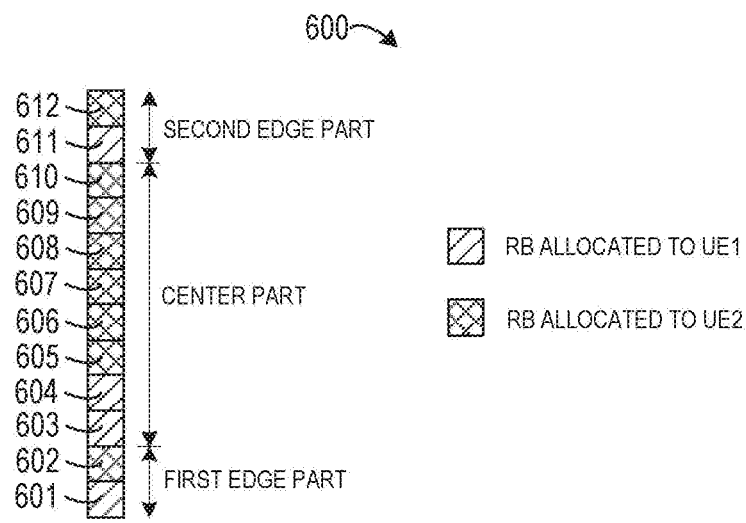
FIG. 6 illustrates a schematic diagram 600 of allocation of RBs according to embodiments of the invention.

FIG. 6 illustrates a schematic diagram 600 of allocation of RBs according to embodiments of the invention. In the example of FIG. 6, the first edge part includes RBs 601-602, the second edge part includes RBs 611-612 and the center part includes RBs 602-609. In the first edge part, the first RB, RB 601, is allocated to UE1 and the second RB, RB 602, is allocated to UE2. In the second edge part, the first RB, RB 611, is allocated to UE1 and the second RB, RB 612, is allocated to UE2. As such, the resource blocks allocated to both UE1 and UE2 will satisfy the resource use requirement. It is to be understood that this is illustrated for example rather than limitation. In another example, if RB 611 in the first edge part and RB 612 in the second edge part are allocated to UE1, then the resource blocks allocated to UE1 will satisfy the resource use requirement as well.

In step 550, a collection of remaining resource blocks from the center part is allocated to the each UE according to a resource allocation request from the UE. With respect to the RBs in the center part, those skilled in the art may implement the allocation thereof in a variety of ways, either existing or to be developed in the future. For example, in step 550, the RBs in the center part may be allocated to the UE set in accordance with either LTE UL type 0 resource allocation or LTE UL type 1 resource allocation. Both the type 0 resource allocation and the type 1 resource allocation are known to those skilled in the art and thus are not detailed here.

In step 560, information about the pair of resource blocks and the collection of remaining resource blocks is sent to the each UE In embodiments of the present invention, the RBs in the first edge part and the RBs in the second edge part may be allocated to UE1 in the same manner, so do the RBs allocated to UE2. In some embodiments, the BS may send information about the type 0 resource allocation or the type 1 resource allocation, as well as the index of the RB(s) allocated to the respective UEs. For example, the BS may send index "1" to UE1 to indicate that the first RB (RB 601) in the first edge part and/or the first RB (RB 611) in the second edge are allocated to UE1, and send index "2" to UE2 to indicate that the second RB (RB 602) in the first edge part and/or the second RB (RB 612) in the second edge are allocated to UE2.

Some examples are shown in the following table 4:

In step 720, the set of UEs is determined from those sending a resource allocation request according to the maximum number. This step is similar to step 330 or step 520, and thus is not detailed here.

In step 730, a first resource block and a second resource block are allocated to each UE of the set of UEs, such that the set of UEs multiplexing in both the first resource block and the second resource block. The frequency span between the first resource block and the second resource block satisfies the resource use requirement. In the embodiments of method 700, the first resource block and the second resource block may be considered as a first edge part and a second edge part, respectively, and the remaining resource blocks may be considered as a center part.

Figure 8:
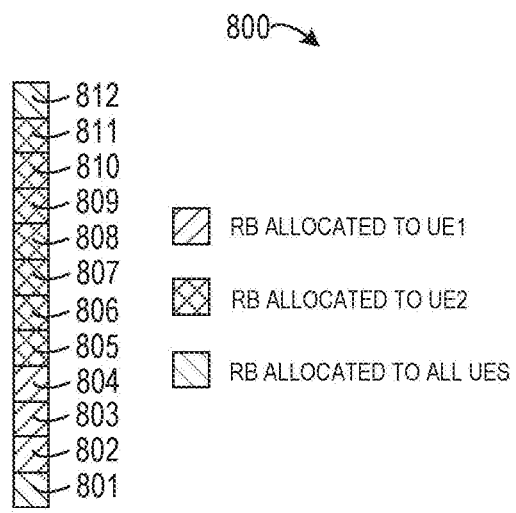
FIG. 8 illustrates a schematic diagram 800 of allocation of RBs according to embodiments of the invention.

FIG. 8 illustrates a schematic diagram 800 of allocation of RBs according to embodiments of the invention. In the example of FIG. 8, assuming that the available resource includes 12 RBs and the resource use requirement is 80%, the first resource block RB 801 and the second resource block RB 812 are allocated to UE1 and UE2. UE1 and UE2 may perform code domain multiplexing on these two RBs 801 and 812. In the example, the center part includes the remaining RBs 802-811.

In step 740, a collection of remaining resource blocks is allocated from the resource to the each UE according to a resource allocation request from the UE, the remaining resource blocks excluding the first and second resource blocks. This step is similar as step 550, and thus is not detailed here. The remaining RBs may be allocated to the UE set in accordance with either type 0 or type 1 resource allocation.

TABLE 4

| System bandwidth | RB number, B | 60% system bandwidth | 20% system bandwidth | Type 0 resource allocation payload for 60% system bandwidth | Type 1 resource allocation payload for 60% system bandwidth | Bit size to indicate edge part | Type 0 total bit size | Type 1 total bit size |
|---|---|---|---|---|---|---|---|---|
| 5 MHz | 25 | 15 | 5 | 7 | 7 | 3 | 10 | 10 |
| 10 MHz | 50 | 30 | 10 | 9 | 9 | 4 | 13 | 13 |
| 20 MHz | 100 | 60 | 20 | 11 | 13 | 5 | 16 | 18 |

Figure 7:
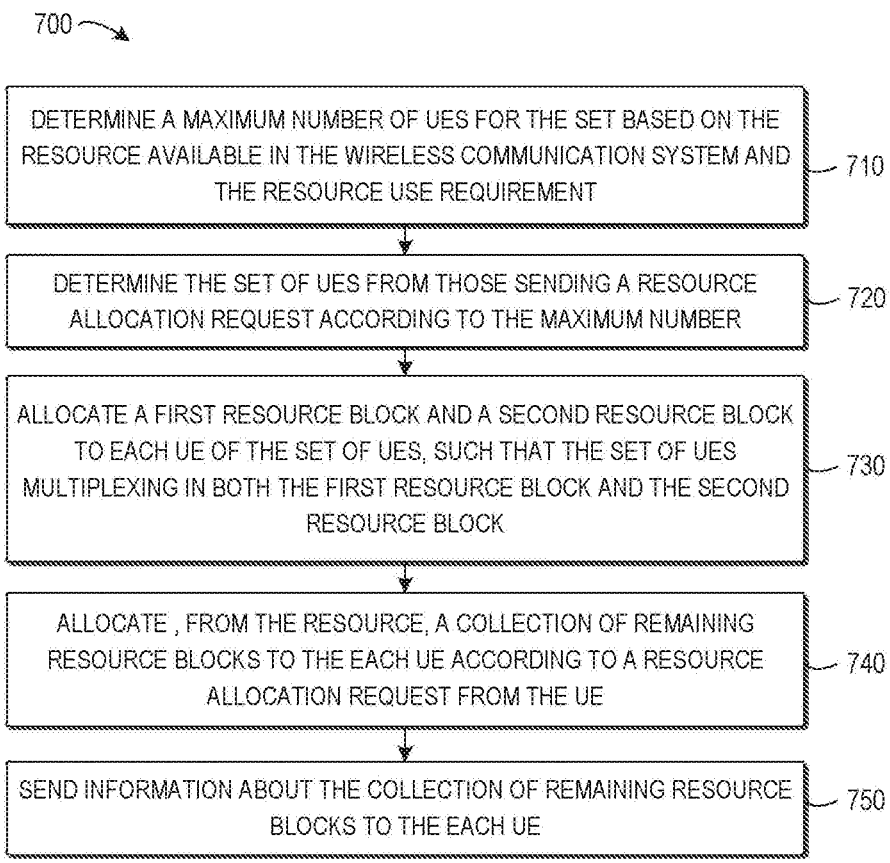
FIG. 7 illustrates a flow chart of a method 700 for allocating resource in a wireless communication system according to a still further embodiment of the invention.

FIG. 7 illustrates a flow chart of a method 700 for allocating resource in a wireless communication system according to a still further embodiment of the invention. The method 700 may be considered as a specific implementation of the method 200 described above with reference to FIG. 2. However, it is noted that this is only for the purpose of illustrating the principles of the present invention, rather than limiting the scope thereof.

The method 700 is entered in step 710, where a maximum number of UEs is determined for the set based on the resource available in the wireless communication system and the resource use requirement. According to embodiments of the present invention, the maximum number may be determined in several ways. For example, the BS may determine the maximum number of UES according to remaining RBs of the available resource excluding the first and last RBs. In the case that the available resource includes 12 RBs and the resource use requirement is 80%, the number of the remaining RBs excluding the first and last RBs is 10. The BS then may decide the maximum number of UEs according to the number of the remaining RBs.

In step 750, information about the collection of remaining resource blocks is sent to the each UE. In some embodiments, the BS may send information about the type 0 resource allocation or the type 1 resource allocation, depending on which type the BS employs. Alternatively or additionally, in some further embodiments, the BS may also send the code domain multiplexing index to each UE. Some examples are shown in the following table 5:

TABLE 5

| System bandwidth | RB number, B | Center part RB number | Type 0 resource allocation payload for center part | Type 1 resource allocation payload for center part | Type 0 total bit size | Type 1 total bit size |
|---|---|---|---|---|---|---|
| 5 MHz | 25 | 23 | 9 | 10 | 9 | 10 |
| 10 MHz | 50 | 48 | 11 | 12 | 11 | 12 |
| 20 MHz | 100 | 98 | 13 | 14 | 13 | 14 |

Embodiments of the present invention may affect the Physical uplink control channel (PUCCH) transmission.

PUCCH is used to carry scheduling request (SR), ACK/NACK, channel state information (CSI), and so on. In the case of PUCCH only transmission, RRC signaling, which can determine the frequency domain position of PUCCH, may design the configuration to satisfy the 80% channel occupancy requirement. This may add additional restriction for PUCCH multiplexing of different UEs. In the case of PUCCH plus PUSCH transmission, if legacy PUSCH resource allocation method is adopted, PUCCH needs to satisfy the same requirement as the PUCCH only case. Collision between PUSCH and PUCCH can be avoided by resource allocation (RA) indication. If the resource allocation method 300 is used, there is no additional requirement for PUCCH compared to that in the legacy release. If there is collision between PUSCH and PUCCH, UE should be excepted to give higher priority to PUCCH. If the resource allocation methods 500 and 700 are used, the edge part can be used to carry PUCCH rather than Physical uplink shared channel (PUSCH), and the RA in Dynamic control information (DCI) format should be able to indicate that no edge part is used by PUSCH by a special value.

Embodiments of the present invention may affect the uplink (UL) Demodulation reference signal (DMRS). In legacy releases, UL DMRS occupy the same RB as PUSCH. The scheduled PUSCH subcarrier number determines the UL DMRS sequence length. In embodiments of the present invention, UL DMRS sequence generation may be the same as in legacy releases. Resource mapping may also link to PUSCH resources as in legacy releases. If the resource allocation method 300 is 30 300 is used, ULDMRS may be mapped in distributed way in frequency domain. If the resource allocation methods 500 and 700 are used, UL DMRS will be mapped to both the center part and the edge parts.

Figure 9:
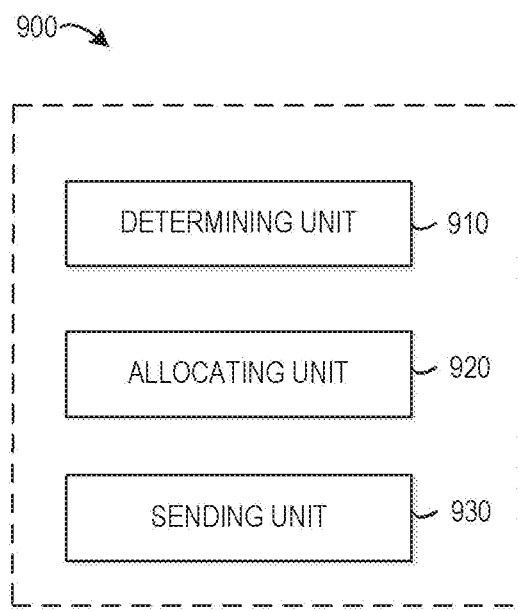
FIG. 9 illustrates a block diagram of a device 900 for allocating resource in a wireless communication system according to embodiments of the invention.

FIG. 9 illustrates a schematic diagram of a device 900 for allocating resource in a wireless communication system according to an embodiment of the invention. According to embodiments of the present invention, the device 900 may be implemented at a BS or other suitable node in the wireless communication system.

As shown in FIG. 9, the device 900 comprises: a determining unit 910 configured to determine a set of UEs requesting for resource allocation based on resource available in the wireless communication system and a resource use requirement; an allocating unit 920 configured to allocate the resource to the set of UEs according to the resource use requirement; and a sending unit 930 configured to send information about the allocated resource to each UE in the set of UEs.

According to embodiments of the present invention, the determining unit 910 may be further configured to: determine a maximum number of UEs for the set based on the resource available in the wireless communication system and the resource use requirement; and determine the set of UEs from those sending a resource allocation request according to the maximum number.

According to embodiments of the present invention, the determining unit 910 may be further configured to: determine, based on the resource use requirement, a periodicity for dividing the resource available in the wireless communication system into multiple groups of resource blocks, the periodicity indicating a number of resource blocks in each group used for allocating to the set of UEs; and determine the maximum number of UEs based on the periodicity.

According to embodiments of the present invention, the allocating unit 920 may be further configured to: divide at least a part of the resource available in the wireless communication system into groups of resource blocks, wherein a number of the resource blocks in each of the groups is equal to the periodicity; determine, in each group of resource blocks, a subgroup of resource blocks for each UE in the set of UEs; and allocate the subgroup of resource blocks to the each UE.

According to embodiments of the present invention, the sending unit 930 may be further configured to: send, to the each UE, information about the periodicity and the subgroup of resource blocks.

According to embodiments of the present invention, the resource includes a first part and a second part that is different from the first part, and the at least a part of the resource is the first part. In the embodiments, the allocating unit 920 may be further configured to: allocate the second part of the resource to one or more UEs in the set of UEs.

According to embodiments of the present invention, the sending unit 930 may be further configured to: send, to the each UE, information about the periodicity, the subgroup of resource blocks, and allocated resource blocks in the second part of the resource.

According to embodiments of the present invention, the allocating unit 920 may be further configured to: divide the resource into a first edge part, a second edge part and a center part without overlap based on the resource use requirement; allocate a pair of resource blocks for each UE of the set of UEs, the pair of resource blocks including a first resource block belonging to the first edge part and a second resource block belonging to the second edge part, wherein a frequency span between the first resource block and the second resource block satisfies the resource use requirement; and allocate, from the center part, a collection of remaining resource blocks to the each UE according to a resource allocation request from the UE.

According to embodiments of the present invention, the sending unit 930 may be further configured to: send information about the pair of resource blocks and the collection of remaining resource blocks to the each UE.

According to embodiments of the present invention, the allocating unit 920 may be further configured to: allocate a first resource block and a second resource block to each UE of the set of UEs, such that the set of UEs multiplexing in both the first resource block and the second resource block, a frequency span between the first resource block and the second resource block satisfying the resource use requirement; and allocate, from the resource, a collection of remaining resource blocks to the each UE according to a resource allocation request from the UE, the remaining resource blocks excluding the first and second resource blocks.

According to embodiments of the present invention, the sending unit 930 may be further configured to: send information about the collection of remaining resource blocks to the each UE.

It is also to be noted that the device 900 may be respectively implemented by any suitable technique either known at present or developed in the future. Further, a single device shown in FIG. 9 may be alternatively implemented in multiple devices separately, and multiple separated devices may be implemented in a single device. The scope of the present invention is not limited in these regards.

It is noted that the device 900 may be configured to implement functionalities as described with reference to FIGS. 2, 3, 5 and 7. Therefore, the features discussed with respect to the methods 200, 300, 500 and 700 may apply to the corresponding components of the device 900. It is further noted that the components of the device 900 may be embodied in hardware, software, firmware, and/or any combination thereof. For example, the components of the device 900 may be respectively implemented by a circuit, a processor or any other appropriate device. Those skilled in the art will appreciate that the aforesaid examples are only for illustration not limitation.

In some embodiment of the present disclosure, the device 900 may comprise at least one processor. The at least one processor suitable for use with embodiments of the present disclosure may include, by way of example, both general and special purpose processors already known or developed in the future. The device 900 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the device 900 to at least perform according to any of the methods 200, 300, 500 and 700 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2, 3, 5 and 7 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a base station, the method comprising:

allocating, to an User Equipment (UE), a set of resource blocks whose corresponding set of indices are calculated by the UE by using an expression:

$$S+n+(i \times P),$$

wherein

S is a numerical index of a first resource block of the resource blocks within bandwidth configured for communication between the base station and the UE, n is one or more integer(s) equal to or greater than 0, wherein each value of n is assigned to the expression $S+n+(i \times p)$, i=0,1, . . . , m−1, wherein is equal to, or is a floor value of a number of resource blocks corresponding to the bandwidth divided by P, wherein each value of i from 0 to m−1 is assigned to the expression $S+n+(i \times P)$, where each value of $S+n+(i \times P)$ depends on which value of i is assigned, and P is either 5 or 10; and receiving an uplink transmission using the set of the resource blocks.

2. The method of claim 1, wherein the set of the resource blocks includes discontinuous resource blocks.

3. The method of claim 1, wherein the base station indicates the set of the resource blocks is indicated by a bitmap.

4. The method of claim 1, wherein multiple values of n are allocated per each of the set of the resource blocks, where each of the multiple values of n is assigned to the expression S+n+(i×P).

5. The method of claim 4, wherein n=0, k, and k>0.

6. A method performed by a User Equipment (UE), the method comprising:
- being allocated a set of resource blocks by a base station;
- calculating a set of indices corresponding to the set of the allocated resource blocks by using an expression:

S+n+(i×P), wherein
  - S is a numerical index of a first resource block of the resource blocks within bandwidth configured for communication between the base station and the UE,
  - n is one or more integer(s) equal to or greater than 0 wherein each value of n is assigned to the expression S+n+(i×P),,
  - i=0,1, ..., m−1, wherein is equal to, or is a floor value of a number of resource blocks corresponding to the bandwidth divided by P, wherein each value of i from 0 to m−1 is assigned to the expression S+n+(i×P), where each value of S+n+(i×P) depends on which value of i is assigned, and
  - P is either 5 or 10; and
- performing an uplink transmission using the set of the resource blocks.

7. The method of claim 6, wherein the set of the resource blocks includes discontinuous resource blocks.

8. The method of claim 6, wherein the set of the resource blocks is indicated by a bitmap.

9. The method of claim 6, wherein multiple values of n are allocated per each of the set of the resource blocks, where each of the multiple values of n is assigned to the expression S+n+(i×P).

10. The method of claim 9, wherein n=0, k, and k>0.

11. A base station comprising a memory that stores a set of instructions; and at least one hardware processor configured to execute the set of instructions to:
- allocate, to an User Equipment (UE), a set of resource blocks whose corresponding set of indices are calculated by the UE by using an expression:

S+n+(i×P), wherein
  - S is a numerical index of a first resource block of the resource blocks within bandwidth configured for communication between the base station and the UE,
  - n is one or more integer(s) equal to or greater than 0, wherein each value of n is assigned to the expression S+n+(i×P),
  - i=0, 1, ..., m−1, wherein is equal to, or is a floor value of a number of resource blocks corresponding to the bandwidth divided by P, wherein each value of i from 0 to m−1 is assigned to the expression S+n+(i×P), where each value of S+n+(i×P) depends on which value of i is assigned, and
  - P is either 5 or 10; and
- receiving an uplink transmission using the set of the resource blocks.

12. The base station of claim 11, wherein the set of the resource blocks includes discontinuous resource blocks.

13. The base station of claim 11, wherein the set of the resource blocks is indicated by a bitmap.

14. The base station of claim 11, wherein multiple values of n are allocated per each of the set of the resource blocks, where each of the multiple values of n is assigned to the expression S+n+(i×P).

15. The base station of claim 14, wherein n=0, k, and k>0.

* * * * *